United States Patent
Bozchalooi et al.

(10) Patent No.: US 11,829,131 B2
(45) Date of Patent: Nov. 28, 2023

(54) VEHICLE NEURAL NETWORK ENHANCEMENT

(71) Applicant: Ford Global Technologies, LLC, Dearborn, MI (US)

(72) Inventors: Iman Soltani Bozchalooi, Sacramento, CA (US); Francois Charette, Tracy, CA (US); Dimitar Petrov Filev, Novi, MI (US); Ryan Burke, Palo Alto, CA (US); Devesh Upadhyay, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 587 days.

(21) Appl. No.: 17/083,469

(22) Filed: Oct. 29, 2020

(65) Prior Publication Data

US 2022/0137634 A1    May 5, 2022

(51) Int. Cl.
| | |
|---|---|
| *G05D 1/02* | (2020.01) |
| *G06T 7/73* | (2017.01) |
| *G06V 10/25* | (2022.01) |
| *G06F 18/22* | (2023.01) |
| *G06F 18/214* | (2023.01) |
| *G06F 18/2113* | (2023.01) |
| *G06N 3/045* | (2023.01) |

(52) U.S. Cl.
CPC ......... *G05D 1/0221* (2013.01); *G06F 18/214* (2023.01); *G06F 18/2113* (2023.01);
(Continued)

(58) Field of Classification Search
CPC .......... G05D 1/0221; G05D 2201/0213; G06T 7/73; G06T 2207/20081;
(Continued)

(56) References Cited

U.S. PATENT DOCUMENTS

| | | | | |
|---|---|---|---|---|
| 10,818,035 | B1* | 10/2020 | Guo | ......................... G06N 3/08 |
| 2019/0303648 | A1* | 10/2019 | Zhai | ..................... G06V 10/764 |
| 2020/0257302 | A1* | 8/2020 | Soltani Bozchalooi | ..................... G06N 20/00 |

OTHER PUBLICATIONS

Wang, et al., Generalizing from a Few Examples: A Survey on Few-Shot Learning, Hong Kong University of Science and Technology and 4Paradigm Inc, May 13, 2019, 35 pages.

(Continued)

*Primary Examiner* — Colby M Hansen
(74) *Attorney, Agent, or Firm* — Brandon Hicks; Bejin Bieneman PLC (57) ABSTRACT

A computer, including a processor and a memory, the memory including instructions to be executed by the processor to train a neural network included in a memory augmented neural network based on one or more images and corresponding ground truth in a training dataset by transforming the one or more images to generate a plurality of one-hundred or more variations of the one or more images including variations in the ground truth and process the variations of the one or more images and store feature points corresponding to each variation of the one or more images in memory associated with the memory augmented neural network. The instructions can include further instructions to process an image acquired by a vehicle sensor with the memory augmented neural network, including comparing a feature variance set for the image acquired by the vehicle sensor to the stored processing parameters for each variation of the one or more images, to obtain an output result.

20 Claims, 6 Drawing Sheets

(52) U.S. Cl.
CPC ............. *G06F 18/22* (2023.01); *G06N 3/045* (2023.01); *G06T 7/73* (2017.01); *G06V 10/25* (2022.01); *G05D 2201/0213* (2013.01); *G06T 2207/20081* (2013.01); *G06T 2207/20084* (2013.01); *G06T 2207/30252* (2013.01)

(58) Field of Classification Search
CPC ........... G06T 2207/20084; G06T 2207/30252; G06V 10/25; G06F 18/22; G06F 18/2113; G06F 18/214; G06N 3/045
USPC .......................................................... 701/59
See application file for complete search history.

(56) References Cited

OTHER PUBLICATIONS

Finn, Chelsea, "Learning to Learn with Gradients," Electrical Engineering and Computer Sciences University of California at Berkeley, Technical Report No. UCB/EECS-2018-105, Aug. 8, 2018, 200 pages.

Bar-Hillel, Aharon, et al., "Learning a Mahalanobis Metric from Equivalence Constraints," Journal of Machine Learning Research 6, 2005, pp. 937-965.

Bateni, Peyman, et al., Improved Few-Shot Visual Classification, University of British Columbia, MILA, Vector Institute, Dec. 7, 2019, 19 pages.

Schwartz, Eli, et al. "Baby Steps Towards Few-Shot Learning with Multiple Semantics," IBM Research AI, Tel-Aviv University, Technion, Jan. 22, 2020, 8 pages.

Korshunova, Iryna, et al., "BRUNO: A Deep Recurrent Model for Exchangeable Data," Ghent University, Oct. 16, 2018, 20 pages.

Das, Debasmit, et al., "A Two-Stage Approach to Few-Shot Learning for Image Recognition," Journal of Latex Class Files, vol. 14, No. 8, Aug. 2015, 16 pages.

"Gaussian Prototypical Networks for Fewshot Learning On Omniglot," Anonymous authors, ICLR 2018, 10 pages.

\* cited by examiner

VEHICLE NEURAL NETWORK ENHANCEMENT

BACKGROUND

Vehicles can be equipped with computing devices, networks, sensors, and controllers to acquire and/or process data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway.

DETAILED DESCRIPTION

A computing device in a traffic infrastructure system can be programmed to acquire data regarding the external environment of a vehicle and to use the data to determine a vehicle path upon which to operate a vehicle in an autonomous or semi-autonomous mode. A vehicle can operate on a roadway based on a vehicle path by determining commands to direct the vehicle's powertrain, braking, and steering components to operate the vehicle to travel along the path. The data regarding the external environment can include the location of one or more objects such as vehicles and pedestrians, etc., in an environment around a vehicle and can be used by a computing device in the vehicle to operate the vehicle.

A computing device in a vehicle can be programmed to detect objects based on image data acquired by a sensor included in the vehicle. The computing device can include a neural network trained to detect objects in image data. Detecting objects in the context of this document means determining object labels and object locations in image data. Object labels typically include a substantially unique identifier for an object such as a text string that identifies the object, where an object is a physical item that occupies three dimensions, e.g., a vehicle, a pedestrian, a bicycle, or a traffic barrier, etc. Locating an object in an image can include determining a bounding box that includes the object, where a bounding box is the smallest rectangle that includes all of the pixels corresponding to the object. A neural network is typically implemented as a computer software program that can be trained to detect objects in image data using training datasets that include images with examples of objects and corresponding ground truth that identifies the objects and includes dimensions of bounding boxes corresponding to the objects. Ground truth is defined as data regarding the object that is obtained from a source independent from the neural network. Typically ground truth data is intended to represent actual real world conditions or states. For example, ground truth regarding the objects can be obtained by having human observers view the images and determine object labels and bounding boxes.

A neural network can be trained by presenting the neural network with a large number (typically >1000) of training images that include objects along with corresponding ground truth. During training the neural network processes an input image and the result, referred to herein as an output state, is compared to the ground truth. The neural network can process the input image a plurality of times, varying processing parameters each time the image is processed. The output state of the neural network is compared to the ground truth to determine a set of processing parameters that achieves the correct output state when presented with an input image. Acquiring a training dataset and ground truth suitable for training a neural network can be expensive, time consuming and unreliable due to the human judgement involved, and is inefficient and challenging in terms of consumption of computing resources.

Techniques discussed herein improve the training and operation of a neural network by generating additional images of an object in a training dataset. Image transformations that alter input images and corresponding ground truth data to increase the number of images and corresponding ground truth in a training dataset can be determined or learned by a neural network. By transforming each image in a training dataset into 500 or more images, a training dataset that includes several thousand images and corresponding ground truth. Increasing the number of training images and corresponding ground truth in this fashion permits training a neural network to detect objects while limiting time, expense and computing resources required to obtain a training dataset. Techniques described herein can also improve training neural networks by permitting a neural network to be trained when only a small number of examples and corresponding ground truth are available in a training dataset. While training a neural network to detect objects for vehicle operation is the example used herein, a neural network trained in this fashion can be used for a plurality of other tasks, including handwriting recognition, surveillance, or facial recognition, etc.

Disclosed herein is a method, including training a neural network included in a memory augmented neural network based on one or more images and corresponding ground truth in a training dataset to identify and locate objects in the one or more images and teach the memory augmented neural network to identify objects at a plurality of locations in the one or more images by transforming the one or more images to generate a plurality of variations of the one or more images including variations in the ground truth. The variations of the one or more images can be processed and feature points corresponding to each variation of the one or more images can be stored in memory associated with the memory augmented neural network. An image acquired by a vehicle sensor can be processed with the memory augmented neural network, including comparing feature points for the image acquired by the vehicle sensor to the feature points for each variation of the one or more images, to obtain an output result. The neural network can include convolutional layers and fully connected layers that generate the feature points for each of the one or more images processed by the neural network, wherein the feature points include values corresponding to a result for each of the one or more images.

A set mean and an inverse covariance corresponding to the feature points can be stored in the memory along with ground truth corresponding to the one or more images. A set mean and an inverse covariance corresponding to feature points output by the neural network can be compared to the set mean and the inverse covariance stored in the memory by determining a Mahalanobis distance and a KL divergence. The output result can be determined by selecting the result from the feature points corresponding to the least Mahalanobis distance. When the Mahalanobis distance cannot distinguish between feature point sets, the KL divergence can be used to select the result. The output result can include an object label and an object location corresponding to an object included in the image acquired by the vehicle sensor, wherein the object label is a text string that identifies the object. The one or more images can be transformed to generate a large number of variations of the one or more images using geometric transformations. The one or more images can be transformed to generate a large number of variations of the one or more images using a second neural network. A vehicle can be operated based on the output results by determining a vehicle path, wherein the vehicle path is a polynomial function. The vehicle can be operated by controlling vehicle brakes, vehicle steering and vehicle powertrain to travel along the vehicle path. The geometric transformations can include translation, reflection, rotation and dilation. The geometric transformations can change pixel location, intensity or color. The image variations formed by the geometric transformations can be stored in a transformation bank.

Further disclosed is a computer readable medium, storing program instructions for executing some or all of the above method steps. Further disclosed is a computer programmed for executing some or all of the above method steps, including a computer apparatus, programmed to train a neural network included in a memory augmented neural network based on one or more images and corresponding ground truth in a training dataset to identify and locate objects in the one or more images and teach the memory augmented neural network to identify objects at a plurality of locations in the one or more images by transforming the one or more images to generate a plurality of variations of the one or more images including variations in the ground truth. The variations of the one or more images can be processed and feature points corresponding to each variation of the one or more images can be stored in memory associated with the memory augmented neural network. An image acquired by a vehicle sensor can be processed with the memory augmented neural network, including comparing feature points for the image acquired by the vehicle sensor to the feature points for each variation of the one or more images, to obtain an output result. The neural network can include convolutional layers and fully connected layers that generate the feature points for each of the one or more images processed by the neural network, wherein the feature points include values corresponding to a result for each of the one or more images.

The computer can be further programmed to store a set mean and an inverse covariance corresponding to the feature points in the memory along with ground truth corresponding to the one or more images. A set mean and an inverse covariance corresponding to feature points output by the neural network can be compared to the set mean and the inverse covariance stored in the memory by determining a Mahalanobis distance and a KL divergence. The output result can be determined by selecting the result from the feature points corresponding to the least Mahalanobis distance. When the Mahalanobis distance cannot distinguish between feature point sets, the KL divergence can be used to select the result. The output result can include an object label and an object location corresponding to an object included in the image acquired by the vehicle sensor, wherein the object label is a text string that identifies the object. The one or more images can be transformed to generate a large number of variations of the one or more images using geometric transformations. The one or more images can be transformed to generate a large number of variations of the one or more images using a second neural network. A vehicle can be operated based on the output results by determining a vehicle path, wherein the vehicle path is a polynomial function. The vehicle can be operated by controlling vehicle brakes, vehicle steering and vehicle powertrain to travel along the vehicle path. The geometric transformations can include translation, reflection, rotation and dilation. The geometric transformations can change pixel location, intensity or color. The image variations formed by the geometric transformations can be stored in a transformation bank.

Figure 1:
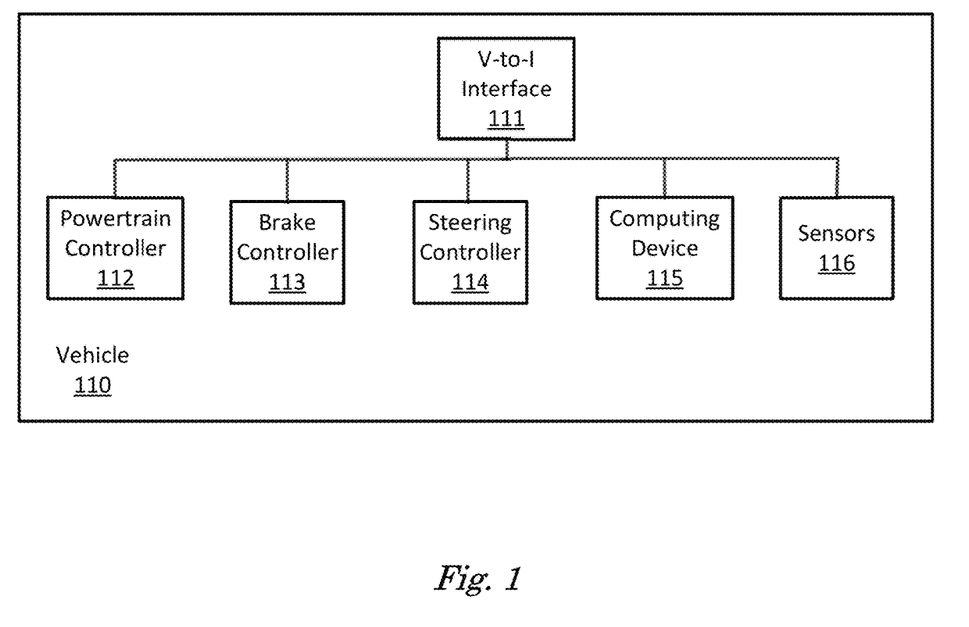
FIG. 1 is a diagram of an example traffic infrastructure system.

FIG. 1 is a diagram of a vehicle 110 operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device (or computer) 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer, e.g., a cloud server, via a network, which, as described below, includes hardware, firmware, and software that permits computing device 115 to communicate with a remote server computer via a network such as wireless Internet (WI-FI®)) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer or user mobile device.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or more of vehicle propulsion, braking, and steering. In a non-autonomous mode, none of these are controlled by a computer.

Figure 2:
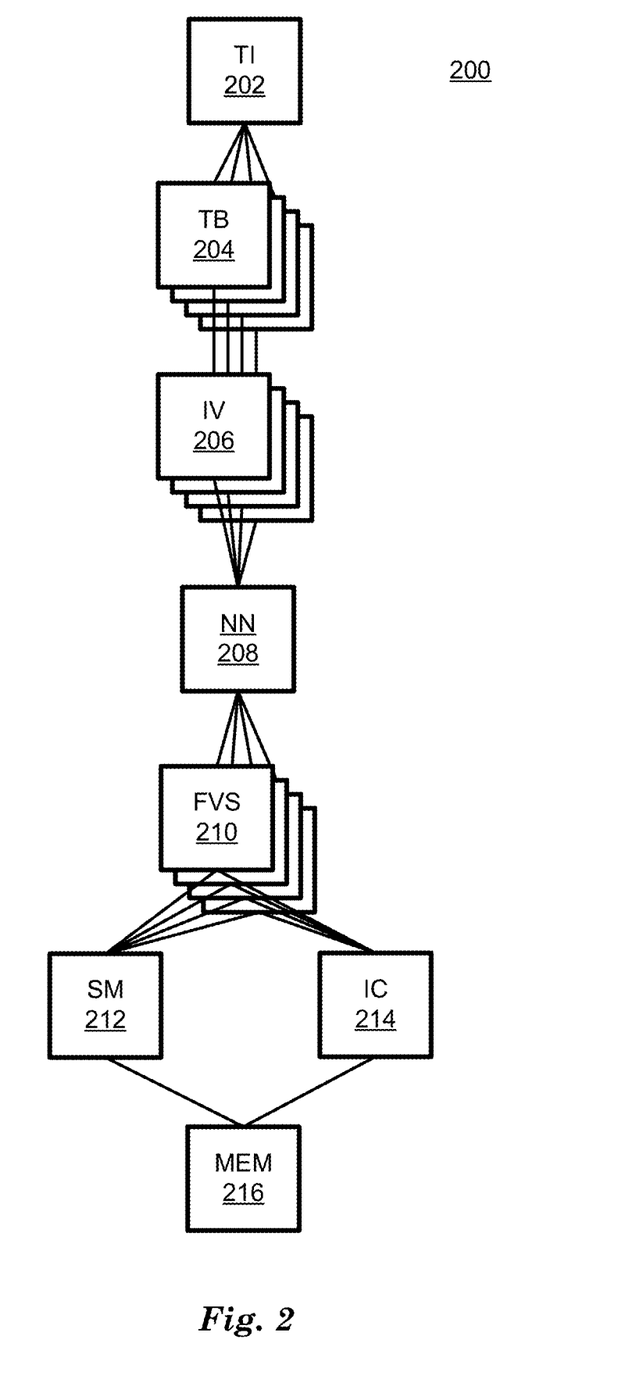
FIG. 2 is a diagram of an example memory augmented neural network during training.

FIG. 2 is a diagram of a memory augmented object detection system 200. A memory augmented object detection system 200 is a software program that can execute on a computing device 115 included in a vehicle 110, for example. In FIG. 2, memory augmented object detection system 200 is configured for training. Memory augmented object detection system 200 can be trained by inputting a training image (TI) 202. Training image 202 includes corresponding ground truth. Ground truth in this example includes a label and a location corresponding to an object included in the training image 202. Training image 202 is input to a transform bank (TB) 204. A transform bank 204 can store a large number of transformations, for example greater than 500. An image transformation is an algorithm that changes the locations or intensity, color, etc. of pixel values in an image. Examples of image transformations that change the locations of pixel values in an image are geometric transformations including translation, reflection, rotation and dilation.

Translation changes the location of a pixel value by changing the x, y address of the pixel by adding or subtracting. Reflection changes the location of a pixel value by first selecting a first straight line that passes through the image and then determining the x, y Euclidian distance from the x, y address of a pixel normal to, meaning at a right angle to, the first straight line. Changing the x, y address of the pixel by negating the x, y Euclidian distance and adding it to the x, y address of the pixel reflects the pixel value about the first straight line. Rotation changes the location of a pixel value by rotating the x, y address of the pixel by an angle theta about a selected center of rotation. Dilation or erosion expands or contracts an image by increasing or decreasing, respectively, the x, y address of a pixel along a radial line connecting the pixel address to a selected dilation or erosion center.

Image transformations can change the appearance and location of objects in an image and can therefore change the parameters that program the neural network (NN) 208. For training a neural network 208 the ground truth that corresponds to a training image 202 is also transformed. For example, if an image transformation changes the location of an object in an image, the ground truth will also be transformed so that the location of the object in the ground truth corresponds to the transformed location of the object in the training image 202. The image transformations included in the transform bank 204 can be selected prior to training or the image transformations can be varied as part of the training process. If the image transformations are varied during training, parameters that govern the image transformations that result in success can be saved along with neural network 208 parameters selected during the training process.

The image transformations can be selected prior to processing the test images 202 with the memory augmented object detection system 200 or during processing of the test images 202. In examples where users determine that the images available in a training dataset do not include images that correspond to the range of object locations and orientations that will be encountered in real world image data, the image transformations can be selected prior to processing. When image transformations are selected prior to processing, a user can select the range and resolution with which the parameters that govern the geometric transformations will be sampled to form the transform bank 204. Selecting image transforms in this fashion will permit users to anticipate the locations and orientations in which objects will occur in real world images that a neural network will process during operation. Once the parameters that geometric transformations are selected, a VAE-type neural network can be trained to locate objects in the training images 202 and perform geometric transforms on the objects to vary locations and orientations and store the new image variations in the transform bank 204.

In other examples, users can determine that the available training images in a training dataset include objects in locations and orientations that correspond to the range of locations and orientations that will be encountered in real world operation of the neural network. In examples where the image transformations are determined based on images in a training dataset, parameters that govern the geometric transform can be determined by processing the test images 202 with a second neural network. A second neural network can be configured input a dataset of test images 202 and output parameters that describe the geometric transformations that would describe the variety of locations and orientations of objects in the dataset of test images 202. A VAE-type can be trained to modify input test images 202 to change the appearance of the input test images 204 according to the parameters of the geometric transforms determined by the second neural network. In this fashion each training image 202 in a training dataset can be modified to produce a plurality of training image 202 variations that correspond to the range of object locations and orientations corresponding to all of the training images 202.

Training images 202 transformed by transform bank 204 are stored as image variations (IV) 206 along with transformed ground truth data. Images stored as image variations 206 are input to the neural network 208 one at a time for processing. A neural network 208 can include convolutional layers. Convolutional layers use a plurality of convolutional kernels to reduce an input image variation 206 to hidden variables. The hidden variables are an encoded representation of the image variation 206 that includes data corresponding to an object label and an object location in the image variation 206. The hidden variables are input to fully connected layers that process the hidden variables to produce output states that include feature points corresponding to object labels and object locations. The feature points are stored in feature variant sets (FVS) 210. A neural network 208 can be trained to output feature points corresponding to correct feature points for a given input image variant by back propagating the feature points output by neural network 208 to be compared to ground truth data corresponding to the input image variant from image variation 206. Back propagation is defined as returning feature points or results from a neural network 208 to compare with ground truth corresponding to the input image variant to form a loss function that indicates how well a particular set of parameters have performed by comparing the output feature points to the corresponding ground truth.

A training image 202 can be input the transform bank 204 to generate a plurality of image variations 206 that are then input to the neural network 208. By processing each image variant from image variation 206 a plurality of times with different parameters and back propagating the output feature points from feature variant set 210, a set of parameters for the convolutional layers and fully connected layers that produce successful results for the image variations 206, i.e. zero or low value loss functions, can be determined. Parameters that correspond to correct answers as confirmed by the loss function are saved as candidate parameters. Following the test runs, the candidate parameters that produce the best results are saved as the parameters that will be used to program the neural network 208 during operation.

When a feature variant set 210 of results that correspond to successful training of the neural network 208 and transform bank 204 is obtained for image variants 206, statistics can be calculated based on the feature variant sets 210. A set mean (SM) 212 can be calculated for the feature points corresponding to each image variant in the feature variant sets 210. Multiple feature points can correspond each object label and object location, for example. A set mean can be determined for the feature points based on each of the image variants in image variations 206 processed by the neural network 208. A feature point is a value output by the neural network 208 that corresponds to an object label and location. For example, an image of a vehicle can be processed by neural network 208 to generate feature points that correspond to vehicle components such as wheel, headlights, windshield, etc. Each feature point can be assigned a number by the neural network 208 that identifies the feature. For example, wheels can be assigned a value of one, headlights can be assigned a two, and windshields can be assigned a value of three. Determining an average or mean value for a set of feature points, i.e., average or mean locations, determined by a neural network 208 can identify the type and orientation of objects in an input image 302. Determining averages or mean values for the x and y pixel addresses of the set of feature points can identify the pixel locations of the feature points in the image. The real world location of the object corresponding to the feature points is determined by the fully connected layers 320 discussed in relation to FIG. 3, below. The set means 212 determined for the feature points in this fashion are stored in memory 216 along with the object label and object location from the ground truth data corresponding to the image variation 206 that generated the feature points.

Memory augmented object detection system 200 also determines the inverse covariance (IC) 214 for the feature points. In examples where the set mean 212 is the same for two or more sets of feature points corresponding to different object labels, inverse covariance 214 can be used to distinguish between the two or more sets of feature points. Inverse covariance 214 is a measure of the partial correlation between two or more variables. Inverse covariance 214 can be determined by calculating a covariance matrix that measures the correlation between the value of each pair of feature points. The covariance matrix can then be inverted to determine the inverse covariance 214 between pairs of feature points. The inverse covariance matrix measures the correlation between the value of each pair of feature points after removing the correlation due to all other feature points. The set means 212 and inverse covariances 214 for each of the image variations 206 is stored in a memory 216 along with the ground truth corresponding to each image variant.

Figure 3:
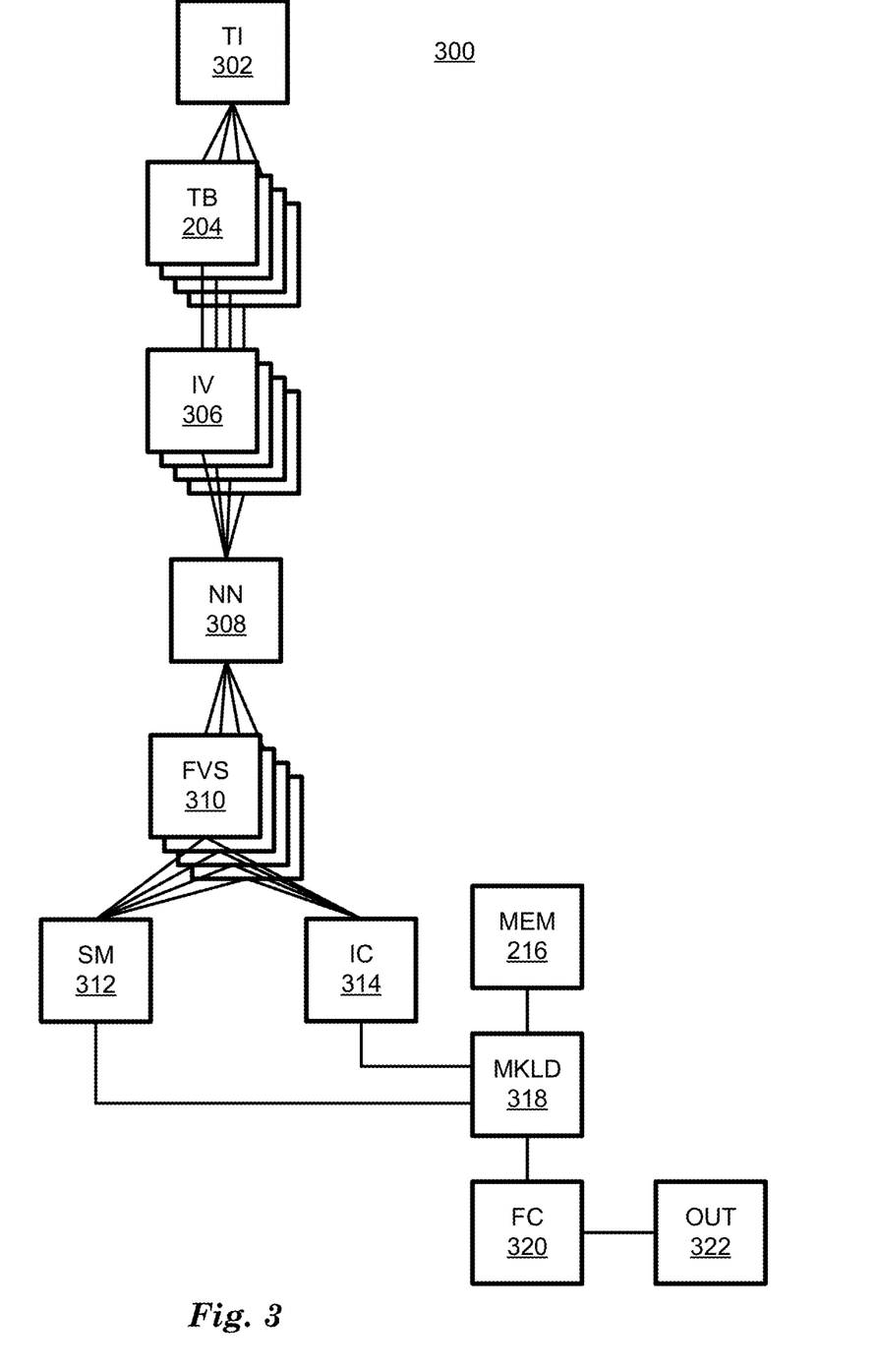
FIG. 3 is a diagram of an example memory augmented neural network during testing.

FIG. 3 is a diagram of a memory augmented neural network 300 configured for testing and operation. Following training as discussed above in relation to FIG. 2, and omitting discussion of elements discussed with respect to FIG. 2 to avoid redundancy, a memory augmented neural network can be configured for testing and operation by adding Mahalanobis distance and Kullback-Leibler (KL) divergence testing block (MKLD) 318 and fully connected layers (FC) 320 to produce output states (OUT) 322. Mahalanobis distance is discussed in relation to FIG. 4, and KL divergence is discussed in relation to FIG. 5. The memory augmented neural network 300 can be tested by submitting test images (TI) 302 to a trained transform bank (TB) 204 from FIG. 2, which produces image variations (IV) 306 based on the test images 302. The test images 302 include ground truth and can be from the same dataset that was used to train the memory augmented object detection system 200. In some examples a training dataset can be divided into two portions, where the first portion is used to train a neural network and the second portion is used to test the neural network. Because the memory augmented neural network 300 increases the number of test images 302 in the same fashion as the training images 202, the memory augmented neural network 300 improves testing by generating large numbers of image variants 306 based on a small number of test images 302, thereby reducing the need to generate large numbers of test images and corresponding ground truth.

During testing and operation, the memory augmented neural network 300 generates a large number (>100) of image variants 306 based on the transform bank 204. The image variants 306 are passed one at a time through the neural network (NN) 308, where they are processed as described above in relation to FIG. 2 to form feature point sets for each image variant that can be stored as feature variant sets (FVS) 310. As described above, set mean (SM) 312 and inverse covariance (IC) 314 are determined based on each feature variant set 310 for each test image 302 input to the transform bank 204. The set mean 312 and inverse covariance 314 are input to Mahalanobis distance and KL divergence testing block (MKLD) 318 to determine which feature variant set 210 stored in memory 216 the current feature variant set 310 matches most closely.

Mahalanobis distance and KL divergence testing block 318 inputs a feature variant set 310 output by neural network 308 in response to an input test image 302 after being transformed by transform bank 204. Determining the least Mahalanobis distance can determine which feature variant set 310 distribution a set of feature points matches most closely. In examples where the set means do not distinguish sets of feature points, KL divergence can determine which set of feature points match which feature variant set 310 most closely by examining the shape of the probability distributions corresponding to the feature points and the feature variant sets 310. Mahalanobis distance and KL divergence testing block 318 selects the feature variant set 210 included in memory 216 that most closely matches the feature variant set 310 output by neural network 308. The feature variant sets 210 included in memory 216 include label and location data corresponding to an object. The feature variant set 210 selected by Mahalanobis distance and KL divergence testing block 318 is output to fully connected layers (FC) 320 where it is processed to determine object labels and object locations to be output as output states (OUT) 322. Fully connected layers 320 input feature points from the memory 216 selected by Mahalanobis distance and KL divergence testing block 318. The fully connected layers 320 determine object labels and real world object locations based on the feature points.

During testing the object label and object location output as output states 322 is back propagated and compared to the object label and object location corresponding to the test image 302 as transformed and output by transform bank 204. For example, if 90% of the object labels are equal to the back propagated object labels and 90% of the back propagated object locations are equal to the object locations included in the transformed test image 302 within a tolerance value, the memory augmented neural network 300 is determined to be successfully trained. A tolerance value can be determined by a user to be +/−10% of the nominal value, for example. Other values for successful labeling and location of objects and other tolerance values can be selected by users based on empirical testing of the memory augmented object detection system 300. The percentages of successful object detection and tolerances can be adjusted based on testing the performance of the completed memory augmented object detection system 300. If a higher rate of successful object detection is desired for the completed memory augmented object detection system 200, the percentages of correct object detection during training can be raised and the tolerance can be lowered until the memory augmented object detection system 200 produces correct results at the desired level. For example, if less than 90% of the back propagated object labels and object locations are determined to be equal to the object label and object locations within the tolerance value, the memory augmented neural network 300 is determined to be unsuccessfully trained, and the memory augmented neural network 300 can be retrained with additional training images 202. If a greater than 90% successful object detection rate is desired, the correct object detection rates during testing can be raised until the memory augmented neural network 300 produces correct results at the desired rate.

When the memory augmented neural network 300 is determined to be successfully trained, the memory augmented neural network 300 can be downloaded to a computing device 115 included in a vehicle 110. The stored memory augmented neural network 300 can be executed by computing device 115 to process images acquired by vehicle sensors and passed directly to the neural network 308, bypassing the transform bank 204 and image variations 306. The feature points output by neural network 308 can be compared to feature variation sets included in memory 316 by Mahalanobis distance and KL divergence testing block 318 to select a feature variation set to be passed to fully connected layers 320 to be processed and output as output states 322 that include an object label and object location corresponding to an object included in the input image acquired by the vehicle sensor. The output object label and object location can be used by the computing device 115 to operate the vehicle by determining a vehicle path based on the object label and object location. The vehicle path can be a polynomial function that avoids contact between the vehicle 110 and the detected object, for example. The vehicle computer 115 can control vehicle powertrain, steering and braking to cause the vehicle 110 to travel on the vehicle path while maintaining vehicle lateral and longitudinal accelerations between upper and lower limits.

Figure 4:
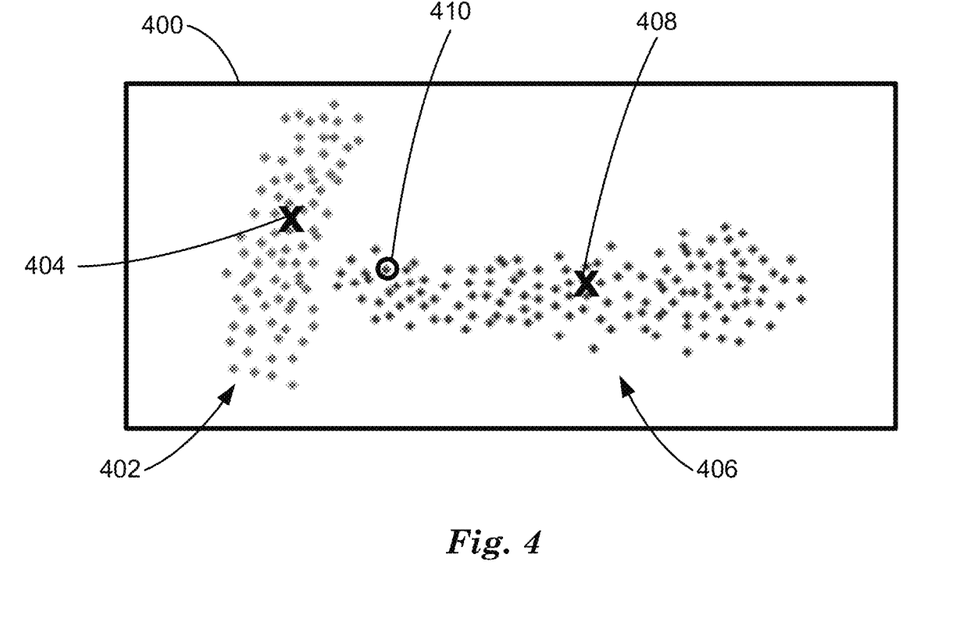
FIG. 4 is a diagram of an example graph illustrating Mahalanobis distance.

FIG. 4 is a diagram of an example graph 400 illustrating Mahalanobis distance M. Mahalanobis distance M is a measure of the distance between a point p and a probability distribution D. Graph 400 includes a first distribution $D_1$ 402 (light grey crosses) having a mean or center 404 (X) and a second distribution $D_2$ 406 (dark grey crosses) having a mean or center 408 (X). Given a point p 410, Mahalanobis distance M measures the distance from point p to the centers 404, 408 of the distributions $D_1$ 402 and $D_2$ 406, respectively. Mahalanobis distance M measures the distance between a point p 410 and the centers 404, 408 in terms of the covariances of the distributions. For the single dimensional case the Mahalanobis distance M can be expressed as the difference between a point and the mean divided by the standard deviation along the direction connecting p to the mean point:

$$M = \frac{x - \mu}{\sigma} \quad (1)$$

where x is the point, $\mu$ is the mean or center 404, 408 and $\sigma$ is the standard deviation of the feature points along the direction of interest (direction connecting p to mean). In graph 400, it appears that point p 410 is closer to the center 404 of distribution $D_1$ 402 than to the center 408 of distribution $D_2$ 406 when measured in Euclidian distance. Measured in Mahalanobis distance M, however, point p is actually closer to center 408 of distribution $D_2$ 406 than center 404 of distribution $D_1$ 402. Mahalanobis distance M takes into account the size and shape of the probability distribution to which a point belongs when calculating distances. Mahalanobis distance is used by memory augmented neural network 300 to determine which feature variant set 210 a measured feature belongs to based on the mean and covariances of the feature variant sets 210.

Figure 5:
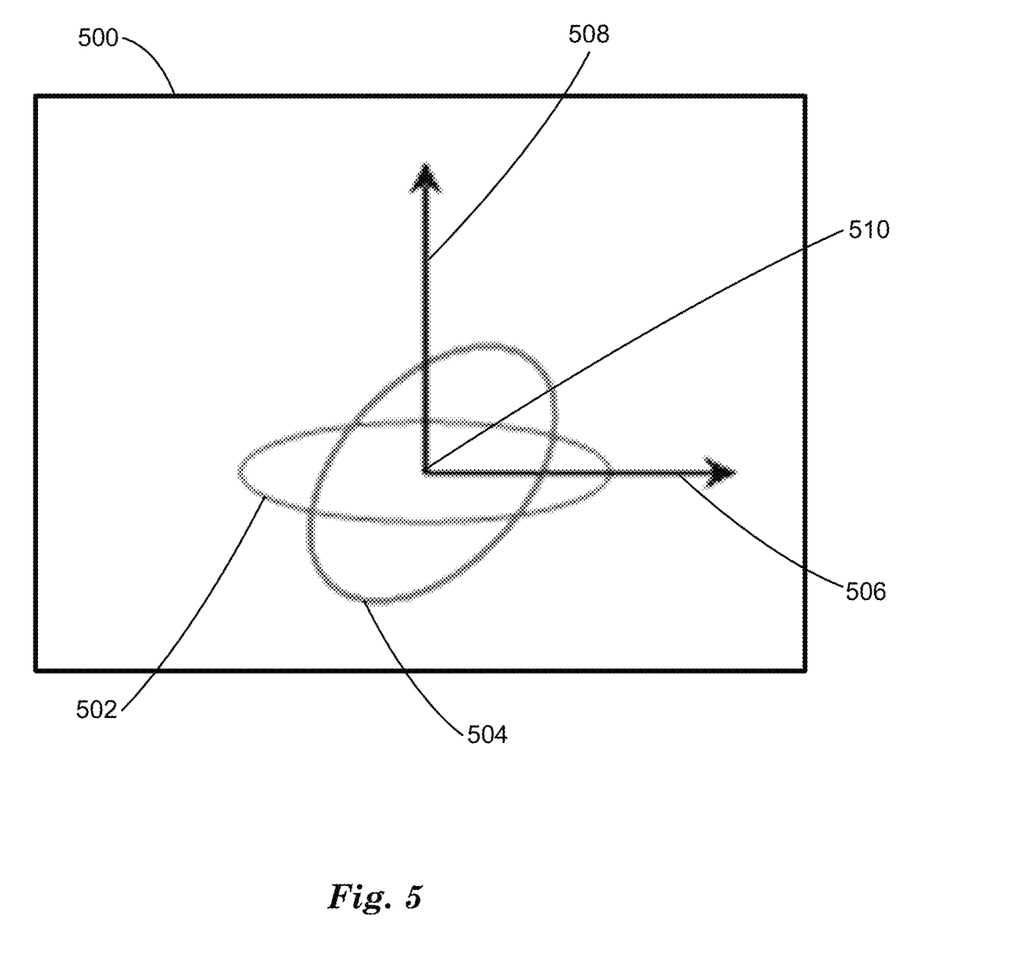
FIG. 5 is a diagram of an example graph illustrating Kullback-Leibler (KL) divergence.

FIG. 5 is a diagram of an example graph 500 illustrating KL divergence. KL divergence is a measure of differences between probability distributions P 502 and Q 504. Graph 500 illustrates probability distributions P 502 and Q 504, which are function of two variables corresponding to two orthogonal axes 506, 508. In this example the probability distributions P 502 and Q 504 have the same mean 510 and cannot be distinguished by determining the mean of the two distributions. KL divergence $D_{KL}$ determines the difference between probability distributions P 502 and Q 504 based on the shape of the distributions P 502 and Q 504 according to the equation:

$$D_{KL}(P|Q) = \sum_{x \in X} P(x) \log\left(\frac{P(x)}{Q(x)}\right) \quad (2)$$

where $D_{KL}(P|Q)$ is the conditional probability of the occurrence of P 502 given Q 504 and P 502 and Q 504 are defined on the same probability space X. KL divergence $D_{KL}$ is used by memory augmented neural network 300 to determine which feature variant set 210 a feature variant set probability distribution belongs to based on the probability distributions of the feature variant sets 210.

Figure 6:
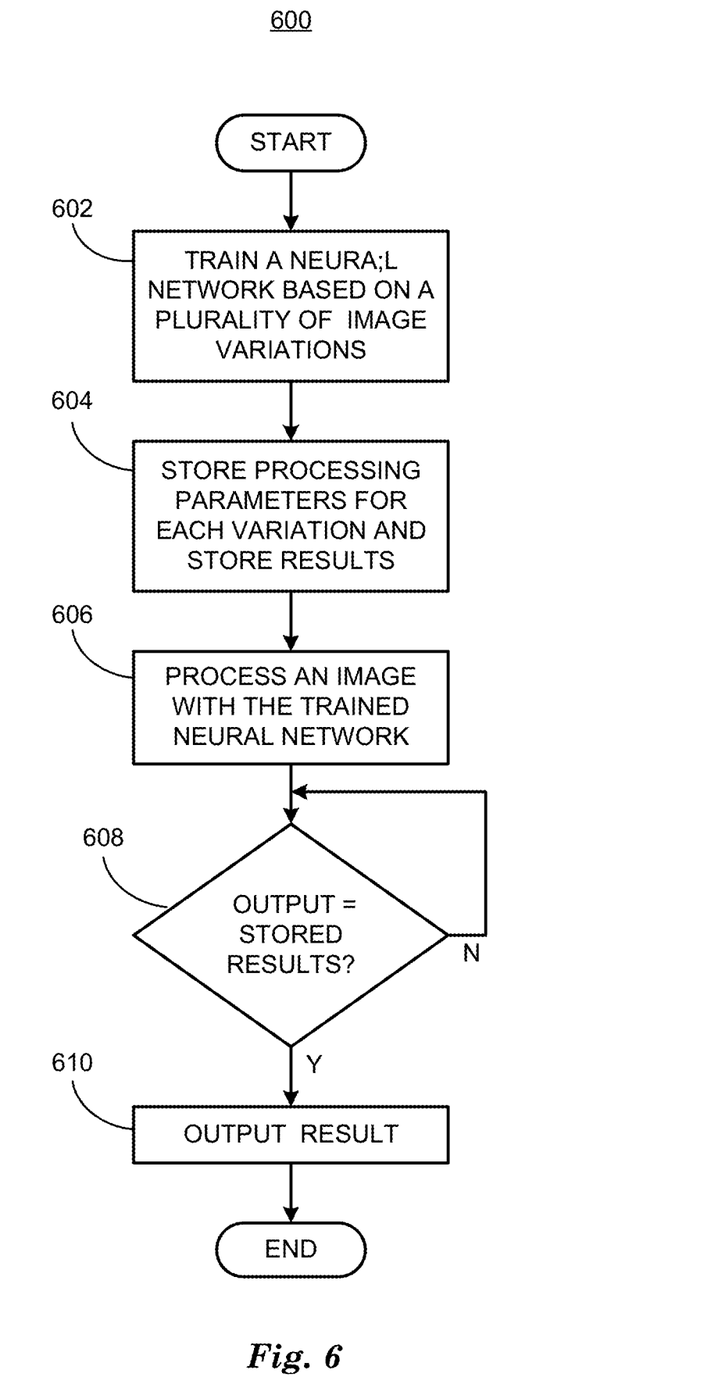
FIG. 6 is a flowchart diagram of an example process to train, test and operate a memory augmented neural network.

FIG. 6 is a diagram of a flowchart, described in relation to FIGS. 1-5, of a process for labeling and locating objects in images. Process 600 can be implemented by a processor of computing device, taking as input information from sensors, and executing commands, and outputting object information, for example. Process 600 includes multiple blocks that can be executed in the illustrated order. Process 600 could alternatively or additionally include fewer blocks or can include the blocks executed in different orders.

Process 600 begins at block 602, where a computing device 115 is used to train a neural network 208 included in a memory augmented object detection system 200 to detect objects in image data as discussed above in relation to FIGS. 2 and 3 using a training dataset that includes training images 202. During training backpropagation is used as discussed above in relation to FIG. 2 to determine parameters which program the convolutional and fully connected layers of the neural network 208 to identify and locate objects in image data.

At block 604 the trained memory augmented neural network 200 is taught to detect objects by generating a large number of variations of each training image. Referring to FIG. 2, training images 202 can be processed based on geometric transformations and stored in transform bank 204 to generate a large number (typically >500) of transformed training images 202. As discussed above in relation to FIG. 2, the geometric transformations can be determined based on user inspection of the training dataset or generated by processing the training dataset with a neural network. The transformed training images 202 are stored as image variations 206 and processed one at a time by neural network 208 to determine feature variant sets 210 corresponding to each transformed training image 202 stored as image variants 206. The computing device 115 processes the feature variant sets 210 to determine the mean 212 and the inverse covariance 214 probability distributions. The mean 212 and the inverse covariance 214 probability distributions are stored in memory 216.

At block 606 the memory augmented neural network 200 processes an image 302 acquired by vehicle sensors with the trained neural network 208 included in a memory augmented neural network 300 configured for run time operation. The memory augmented neural network 200 bypasses the transform bank 204 and processes the input image 302 with the trained neural network 308 to determine output features. The feature variant set resulting from processing the image 302 bypasses the feature variant sets 310 and is processed to determine set mean 312 and set inverse covariance 314 as discussed above in relation to FIG. 3.

At block 608 computing device 115 calculates the Mahalanobis distance M and KL divergence $D_{KL}$ between the determined set mean 312 and set inverse covariance 314 and the set means 312 and set inverse covariances 314 stored in memory 216 at teaching time. Computing device 115 cycles through all of the feature variant sets included in memory 216 to determine which feature variant set the determined set mean 312 and inverse covariance 314 most closely match based on Mahalanobis distance M and KL divergence $D_{KL}$.

At block 610 the memory augmented neural network 300 process the results based on the Mahalanobis distance M and KL divergence $D_{KL}$ to fully connected layers 320 to determine the output states 322 corresponding to the object label and object location. The object label and object location can be used by computing device 115 to operate vehicle 110 by determining a vehicle path as discussed above. A memory augmented neural network 300 trained a discussed in relation to FIG. 2 can be used for a variety of tasks in addition to vehicle operation, including handwriting recognition, facial recognition, and surveillance, etc.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising:
a processor; and
a memory, the memory including instructions executable by the processor to:
train a neural network included in a memory augmented neural network based on one or more images and corresponding ground truth in a training dataset to identify and locate objects in the one or more images;
teach the memory augmented neural network to identify objects at a plurality of locations in the one or more images by transforming the one or more images to generate a plurality of variations of the one or more images including variations in the ground truth;
process the variations of the one or more images and store feature points corresponding to each variation of the one or more images in memory associated with the memory augmented neural network; and
process an image acquired by a vehicle sensor with the memory augmented neural network, including comparing feature points for the image acquired by the vehicle sensor to the stored feature points for each variation of the one or more images, to obtain an output result.

2. The computer of claim 1, wherein the neural network includes convolutional layers and fully connected layers that generate the feature points for each of the one or more images processed by the neural network, wherein the feature points include values corresponding to a result for each of the one or more images.

3. The computer of claim 1, wherein a set mean and an inverse covariance corresponding to the feature points are stored in the memory along with ground truth corresponding to the one or more images.

4. The computer of claim 3, the instructions including further instructions to compare a set mean and an inverse covariance corresponding to feature points output by the neural network to the set mean and the inverse covariance stored in the memory by determining a Mahalanobis distance and a KL divergence.

5. The computer of claim 4, wherein the output result is determined by selecting the result from the feature points corresponding to the least Mahalanobis distance.

6. The computer of claim 5, wherein, when the Mahalanobis distance cannot distinguish between feature point sets, the KL divergence is used to select the result.

7. The computer of claim 1, wherein the output result includes an object label and an object location corresponding to an object included in the image acquired by the vehicle sensor, wherein the object label is a text string that identifies the object.

8. The computer of claim 1, the instructions including further instructions to transform the one or more images to generate a large number of variations of the one or more images using geometric transformations.

9. The computer of claim 1, the instructions including further instructions to transform the one or more images to generate a large number of variations of the one or more images using a second neural network.

10. The computer of claim 1, the instructions including further instructions of operate a vehicle based on the output results by determining a vehicle path, wherein the vehicle path is a polynomial function.

11. The computer of claim 10, the instructions including further instructions to operate the vehicle by controlling vehicle brakes, vehicle steering and vehicle powertrain to travel along the vehicle path.

12. A method, comprising:
  training a neural network included in a memory augmented neural network based on one or more images and corresponding ground truth in a training dataset to identify and locate objects in the one or more images;
  teach the memory augmented neural network to identify objects at a plurality of locations in the one or more images by transforming the one or more images to generate a plurality of variations of the one or more images including variations in the ground truth;
  processing the variations of the one or more images and store feature points corresponding to each variation of the one or more images in memory associated with the memory augmented neural network; and
  processing an image acquired by a vehicle sensor with the memory augmented neural network, including comparing feature points for the image acquired by the vehicle sensor to the feature points for each variation of the one or more images, to obtain an output result.

13. The method of claim 12, wherein the neural network includes convolutional layers and fully connected layers that generate the feature points for each of the one or more images processed by the neural network, wherein the feature points include values corresponding to a result for each of the one or more images.

14. The method of claim 12, wherein a set mean and an inverse covariance corresponding to the feature points are stored in the memory along with ground truth corresponding to the one or more images.

15. The method of claim 14, further comprising comparing a set mean and an inverse covariance corresponding to feature points output by the neural network to the set mean and the inverse covariance stored in the memory by determining a Mahalanobis distance and a KL divergence.

16. The method of claim 15, wherein the output result is determined by selecting the result from the feature points corresponding to the least Mahalanobis distance.

17. The method of claim 16, wherein, when the Mahalanobis distance cannot distinguish between feature point sets, the KL divergence is used to select the result.

18. The method of claim 12, wherein the output result includes an object label and an object location corresponding to an object included in the image acquired by the vehicle sensor, wherein the object label is a text string that identifies the object.

19. The method of claim 12, further comprising transforming the one or more images to generate a large number of variations of the one or more images using geometric transformations.

20. The method of claim 12, further comprising transforming the one or more images to generate a large number of variations of the one or more images using a second neural network.

* * * * *